(12) United States Patent
Hsiao

(10) Patent No.: US 7,289,318 B2
(45) Date of Patent: Oct. 30, 2007

(54) AUXILIARY FIXING MECHANISM FOR AN INTERFACE CARD

(75) Inventor: Tsung-Te Hsiao, Jhunan Township, Miaoli County (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 256 days.

(21) Appl. No.: 11/229,658

(22) Filed: Sep. 20, 2005

(65) Prior Publication Data

US 2007/0064382 A1 Mar. 22, 2007

(51) Int. Cl.
- G06F 1/16 (2006.01)
- H05K 7/18 (2006.01)
- H05K 1/00 (2006.01)
- A47B 96/00 (2006.01)
- A47G 19/08 (2006.01)

(52) U.S. Cl. ............ 361/686; 361/679; 361/683; 361/732; 361/740; 361/749; 361/752; 361/759; 361/796; 361/801; 361/802; 220/4.02; 248/222.52; 312/223.2; 211/41.17

(58) Field of Classification Search ........... 361/679, 361/683, 686, 749, 740, 759, 801, 732, 752, 361/741, 747, 728, 755, 807; 211/41.17, 211/26; 312/223.1, 223.2, 216, 273.3, 183, 312/265.5, 265.6; 439/327, 368; 174/50, 174/50.51, 50.52, 51, 66, 67

See application file for complete search history.

(56) References Cited

U.S. PATENT DOCUMENTS

| | | | |
|---|---|---|---|
| 5,947,571 A * | 9/1999 | Ho | 312/265.6 |
| 5,967,466 A * | 10/1999 | Osborne et al. | 248/27.1 |
| 6,480,392 B1 * | 11/2002 | Jiang | 361/755 |
| 6,549,398 B2 * | 4/2003 | Chen | 361/683 |
| 6,552,913 B2 * | 4/2003 | Tournadre | 361/759 |
| 6,608,765 B2 * | 8/2003 | Vier et al. | 361/801 |
| 6,618,264 B2 * | 9/2003 | Megason et al. | 361/759 |
| 6,693,800 B1 * | 2/2004 | Lin et al. | 361/759 |
| 6,834,766 B2 * | 12/2004 | Lin et al. | 211/41.17 |
| 6,937,467 B2 * | 8/2005 | Hsu | 361/686 |
| 7,054,164 B2 * | 5/2006 | Shih-Tsung | 361/801 |
| 7,120,028 B2 * | 10/2006 | Hsu | 361/726 |
| 7,161,798 B2 * | 1/2007 | Chen et al. | 361/679 |

* cited by examiner

Primary Examiner—Jayprakash Gandhi
Assistant Examiner—Zachary M Pape
(74) Attorney, Agent, or Firm—Rosenberg, Klein & Lee

(57) ABSTRACT

An auxiliary fixing mechanism is used for fixing an interface card to the housing of a computer. The auxiliary fixing mechanism includes an I/O window and an auxiliary fastener. The I/O window has a fixing slot and a first screw hole. The auxiliary fastener includes a first baffle, a second baffle, a third baffle, a fixing hook and a positioning hook. A screw is passed through the second screw hole of the auxiliary fastener in a direction that is vertical to the interface card. The bracket of the interface card is pushed and stopped by the baffles to restrict the movement of the interface card. Thereby, the auxiliary fixing mechanism can change the fixing direction for fixing the screw to prevent the prior art problem that the interface card could not be fixed to the housing via a screw due to space limitations.

7 Claims, 6 Drawing Sheets

AUXILIARY FIXING MECHANISM FOR AN INTERFACE CARD

BACKGROUND OF THE INVENTION

1. Field of the Invention

The present invention relates to an auxiliary fixing mechanism for an interface card. In particular, this invention provides an auxiliary fixing mechanism used for fixing an interface card in a desktop PC, a PC barebone or an industrial computer.

2. Description of the Related Art

Motherboards use computer interface cards to communicate with peripheral devices. If they lack the interface card, such as an audio card or a network card, the CPU cannot transmit the commands to the peripherals.

There are a plurality of slots in a motherboard. The slots are called interface card slots. The interface cards that are used for increasing the functions of the computer are plugged in these interface card slots.

There are many I/O windows installed in the rear side of the housing of the computer. The interface card is installed in the I/O windows and is fixed to the I/O windows by screwing on the bracket of the interface card with a screw.

However, in some computers, the interface card is installed horizontally and cannot be fixed onto the housing by a screw due to space limitations. So, it is inconvenient for fixing the interface card onto the housing.

SUMMARY OF THE INVENTION

One particular aspect of the present invention is to provide an auxiliary fixing mechanism for an interface card. The auxiliary fixing mechanism can change the fixing direction for fixing the screw to the interface card. It prevents the problem of the interface card not being able to be fixed onto the housing by a screw due to space limitations.

The present invention provides an auxiliary fixing mechanism for fixing an interface card to the housing of a computer. The auxiliary fixing mechanism for an interface card includes an I/O window, an auxiliary fastener and a bracket in the interface card. The I/O window is located in the rear side of the housing. The I/O window has a rectangular hole. The I/O window has a fixing slot and a first screw hole located in the side of the I/O window. The auxiliary fastener includes a first baffle, a second baffle, a third baffle, a fixing hook and a positioning hook. A second screw hole is located at the first baffle. The second baffle and the fixing hook are connected with the first baffle. The third baffle and the positioning hook are connected with the second baffle. The fixing hook of the auxiliary fastener passes through the fixing slot of the I/O window to make the auxiliary fastener fix rotatably to the I/O window. The bracket of the interface card is installed on the I/O window. The positioning hook of the auxiliary fastener is plugged into a corresponding through hole on the bracket of the interface card to achieve the position goal. A screw is passed through the second screw hole of the auxiliary fastener in a direction that is vertical to the interface card and is screwed on the first screw hole of the I/O window. Thereby, the auxiliary fastener is fixed onto the housing and the bracket of the interface card is pushed and stopped by the baffles to restrict the movement of the interface card in any direction.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 5:
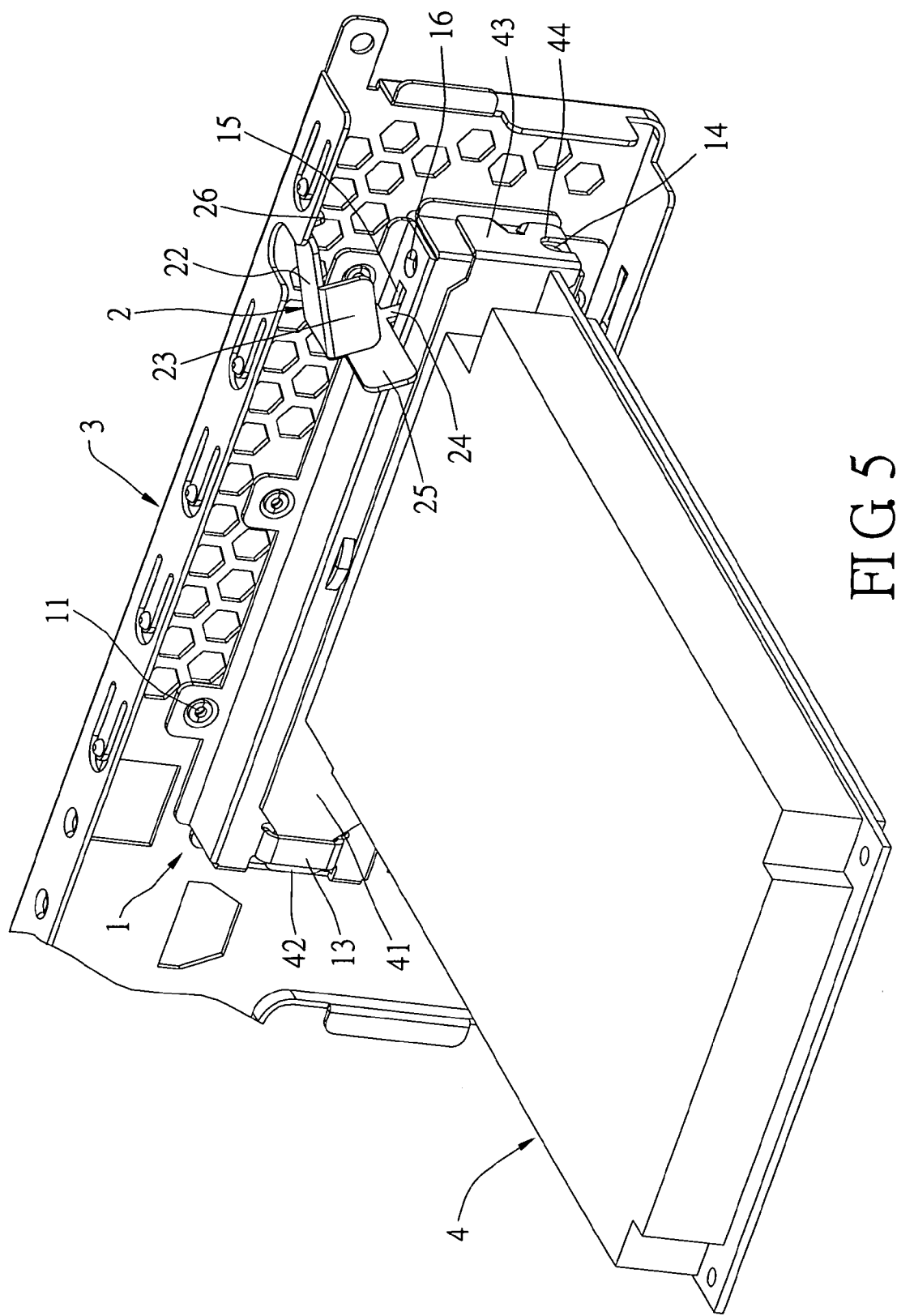
FIG. 5 is a first perspective view of the interface card assembled in the computer housing of the present invention.
Figure 6:
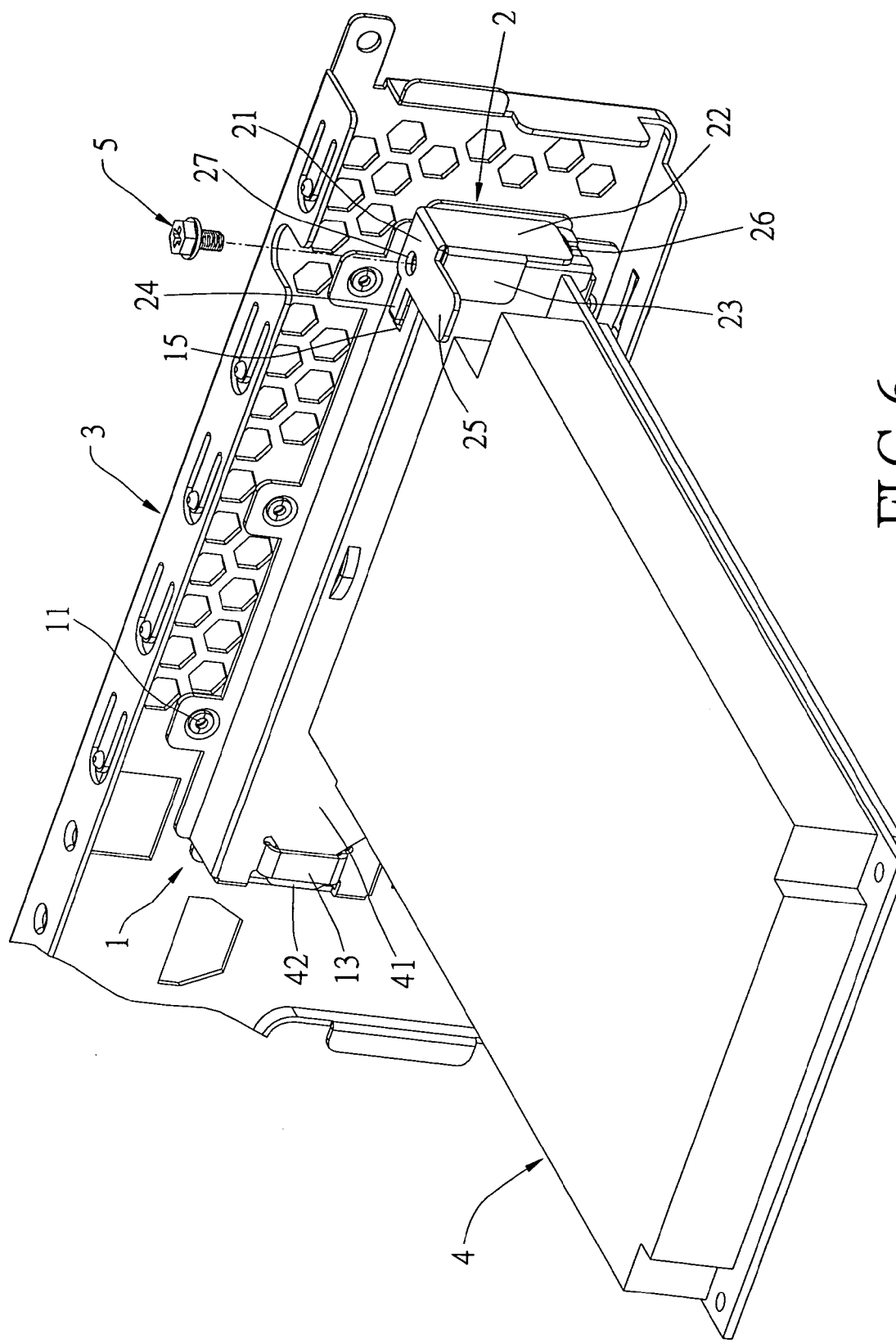
FIG. 6 is a second perspective view of the interface card assembled in the computer housing of the present invention.

Please refer to FIGS. 1-4. The present invention provides an auxiliary fixing mechanism for an interface card. The auxiliary fixing mechanism is used for fixing interface cards onto the housing of a desktop PC, a PC barebone or an industrial computer. The auxiliary fixing mechanism for an interface card includes an I/O window 1 and an auxiliary fastener 2. The I/O window 1 is located in the rear side of the computer's housing 3. The I/O window 1 is similar to a rectangular bracket. The I/O window 1 is fixed on the rear side of the housing 3 via a fixing element 11, such as a screw or a rivet. The I/O window 1 has a rectangular hole 12 located at the front surface of the I/O window 1. The I/O window 1 has a plug base 13 protruded and located at one end near the front surface of the I/O window 1 and the plug base 13 is used for plugging one end of the bracket 41 of the interface card 4 (as shown in FIGS. 5 and 6). A fixing hole 14 is located at another end of the I/O window 1 for positioning the auxiliary fastener 2. The I/O window 1 has a fixing slot 15 and a first screw hole 16 located in the side of the I/O window 1. The shape of the fixing slot 15 is rectangular or of another shape. The fixing slot 15 is used for fixing the auxiliary fastener 2. The auxiliary fastener 2 is fixed onto the housing 3 by screwing a screw 5 in the first screw hole 16.

The auxiliary fastener 2 is made of metal material or another material. The auxiliary fastener 2 includes a first baffle 21, a second baffle 22, a third baffle 23, a fixing hook 24, a rotation handle 25 and a positioning hook 26. The first baffle 21 is a horizontal plate. The first baffle 21 has a second screw hole 27. The screw 5 is plugged into the second screw hole 27 for fixing the auxiliary fastener 2 onto the housing 3.

The second baffle 22 is connected to one side of the first baffle 21. The second baffle 22 extends downward an appropriate distance. The second baffle 22 is vertical to the first baffle 21. The third baffle 23 is connected to one side of the second baffle 22. The third baffle 23 extends downward an appropriate distance. The third baffle 23 is vertical to the second baffle 22. The first baffle 21, the second baffle 22 and the third baffle 23 restricts the movement of the interface card 4.

The fixing hook 24 is connected to another side of the first baffle 21. The fixing hook 24 extends a distance that is far away from the first baffle 21 and extends downward. The shape of one end of the fixing hook 24 is T-shaped. Thereby, the auxiliary fastener 2 is fixed onto the housing 3 and can be rotated.

The rotation handle 25 is connected to another side of the first baffle 21. The rotation handle 25 extends a distance that is far away from the first baffle 21. As such, a user can rotate the auxiliary fastener 2. The positioning hook 26 is connected to a lower side of the second baffle 22. The positioning hook 26 protrudes from the second baffle 22 so that it may be plugged into the corresponding through hole 44 and the fixing hole 14 on the interface card 4 and the I/O window 1 to achieve the positioning goal.

Figure 1:
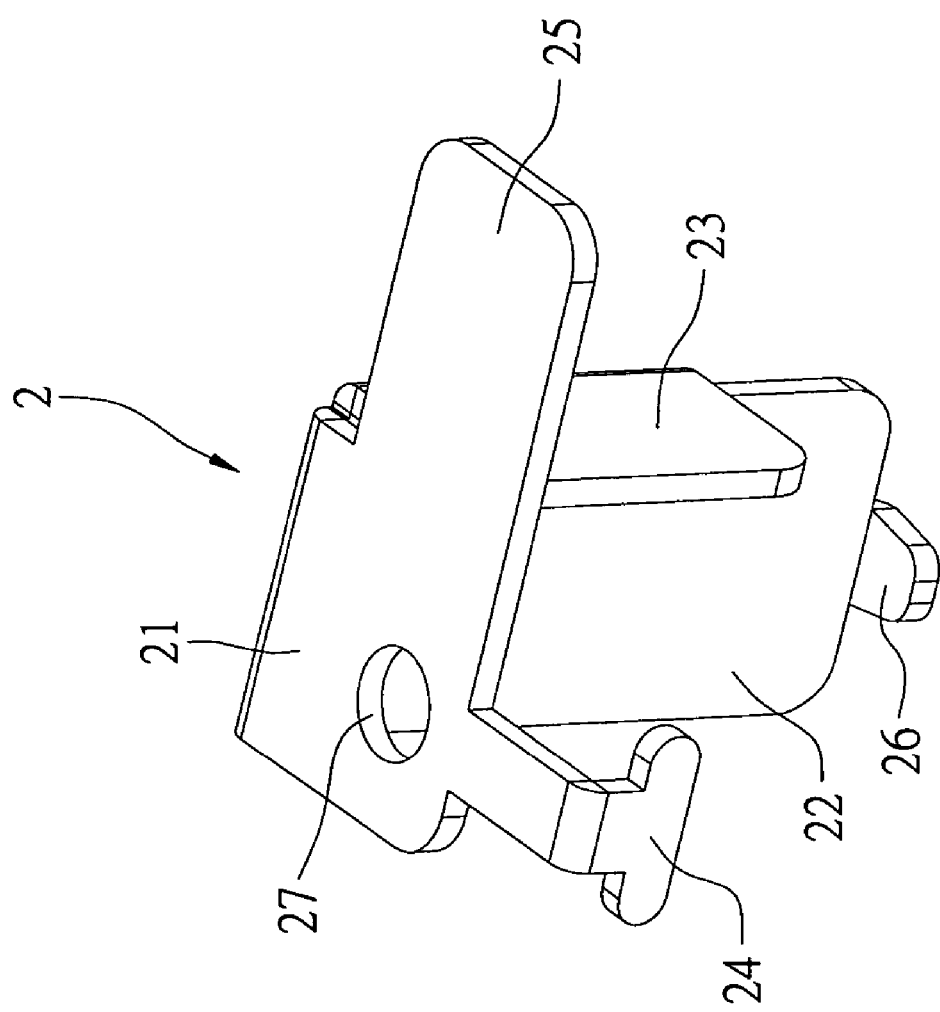
FIG. 1 is a perspective view of the auxiliary fastener of the present invention.
Figure 2:
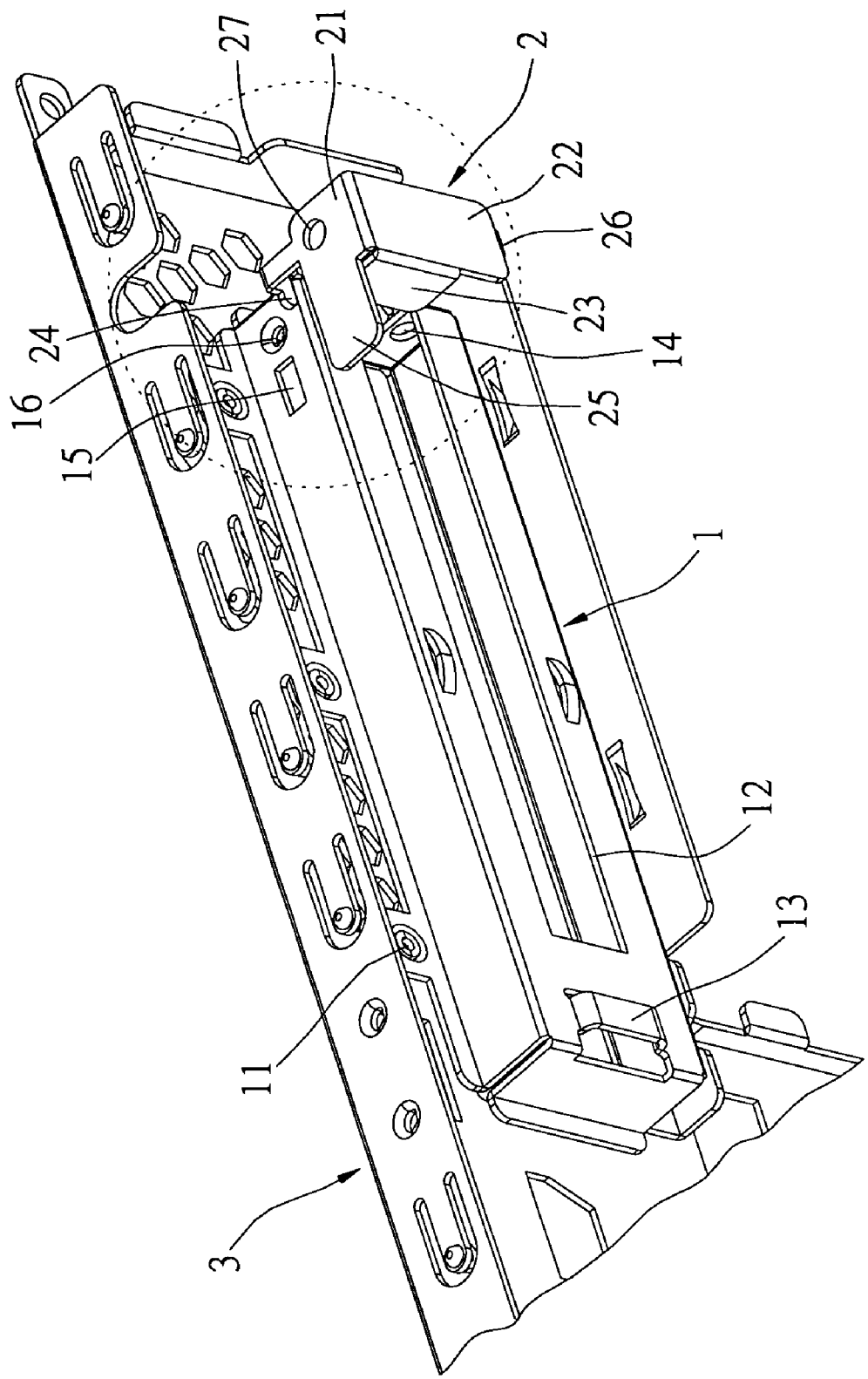
FIG. 2 is a perspective view of the auxiliary fastener separated from the computer's housing of the present invention.
Figure 3:
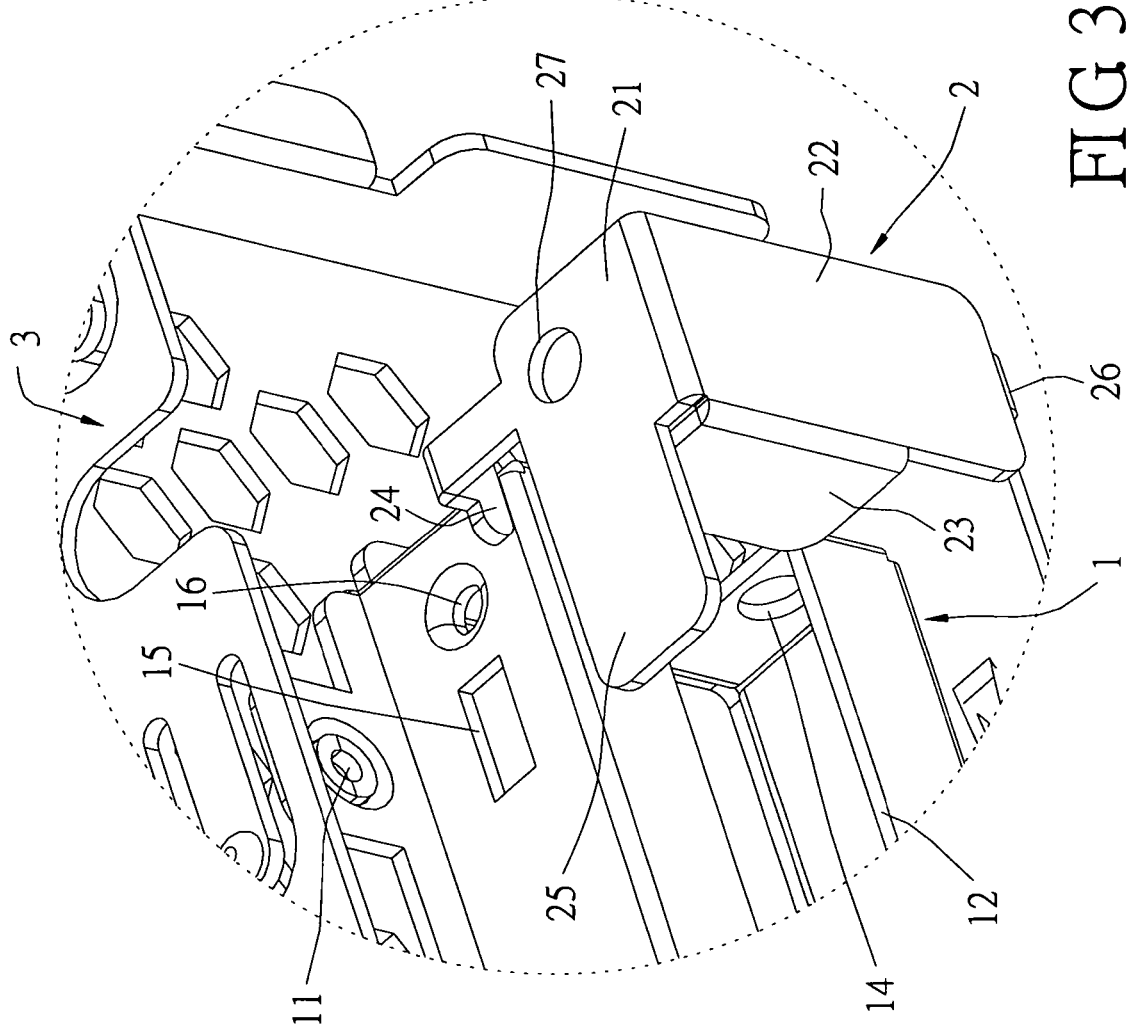
FIG. 3 is a detailed perspective view of the auxiliary fastener separated from the computer housing of the present invention.
Figure 4:
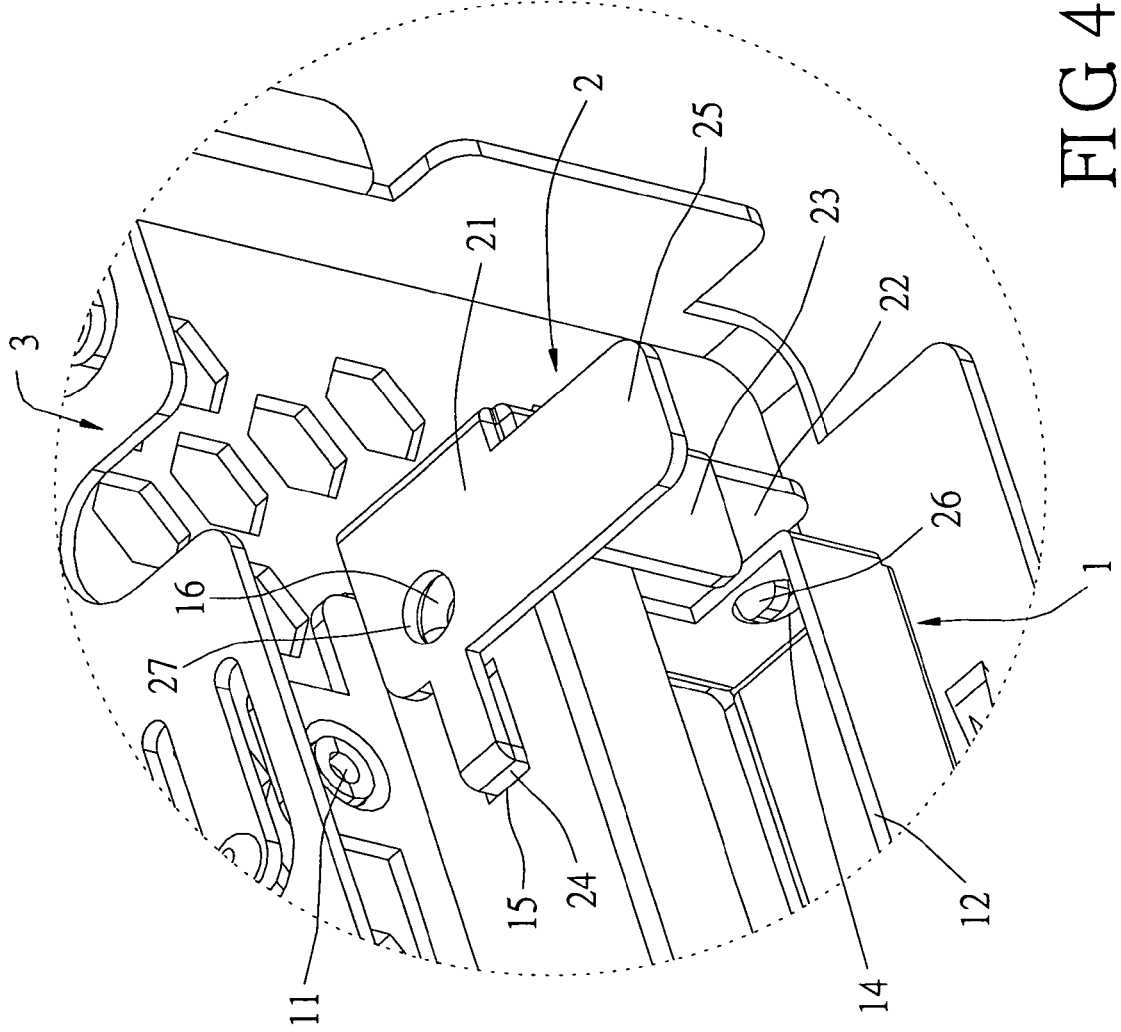
FIG. 4 is a detailed perspective view of the auxiliary fastener assembled in the computer housing of the present invention.

Please refer to FIGS. 3 and 4. When the auxiliary fastener 2 is assembled on the I/O window 1 of the housing, the fixing hook 24 of the auxiliary fastener 2 is plugged into the fixing slot 15 of the I/O window 1 and the auxiliary fastener 2 is rotated 90 degrees counterclockwise (as shown in FIG. 4). The auxiliary fastener 2 is fixed to the housing 3 via the fixing hook 24 and the auxiliary fastener 2 can be rotated.

Please refer to FIGS. 5 and 6. The interface card 4 has a bracket 41 connected to one end of the interface card 4. The bracket 41 is an L-shaped slice. A plugged part 42 and a fixing part 43 are individually formed at two ends of the bracket 41. The fixing part 43 has a through hole 44 that corresponds to the fixing hole 14. When the interface card 4 is assembled to the housing 3, the user can use the rotation handle 25 to turn over the auxiliary fastener 2 and make the auxiliary fastener 2 turn over to the upper location of the I/O window 1 (as shown in FIG. 5). Then, the interface card 4 is installed. The plugged part 42 located at one end of the bracket 41 of the interface card 4 is plugged and fixed at the plug base 13 of the I/O window 1. The fixing part 43 located at another end of the bracket 41 of the interface card 4 is jointed at another end of the I/O window 1. Therefore, the bracket 41 of the interface card 4 is installed in the I/O window 1 and the through hole 44 of the fixing part 43 corresponds to the fixing hole 14 of the I/O window 1. Then, the auxiliary fastener 2 is turned back and the positioning hook 26 of the auxiliary fastener 2 is plugged into the through hole 44 and the fixing hole 14. In this way, the positioning target is achieved. Finally, a screw 5 used for fixing is passed through the second screw hole 27 of the auxiliary fastener 2 in a direction that is vertical to the interface card and is screwed into the first screw hole 16 of the I/O window 1. Thereby, the auxiliary fastener 2 is fixed onto the housing 3. So, the bracket 41 of the interface card 4 is pushed and stopped by the baffles 21, 22 and 23 to restrict the movement of the interface card 4.

The present invention utilizes the fixing hook 24 of the auxiliary fastener 2 to fix with the fixing slot 15 of the I/O window 1 to provide the fixing and the movement function of the auxiliary fastener 2. The present invention uses the positioning hook 26 of the auxiliary fastener 2 and the baffles 21, 22 and 23 to fix the interface card 4. Finally, the present invention uses the screw 5 to screw the auxiliary fastener 2 in a direction that is vertical to the interface card on the I/O window 1. Thereby, the interface card 4 is fixed.

Therefore, the auxiliary fastener of the present invention changes the fixing direction for fixing the screw to the interface card. It is achieved by screwing the screw in a direction that is vertical to the interface card. The present invention prevents the prior art problem of the interface card not being fixed to the housing via a screw due to space limitations.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. An auxiliary fixing mechanism for fixing an interface card, for fixing the interface card to a housing of a computer, comprising:

an I/O window located in a rear side of the housing, wherein the I/O window has a rectangular hole, and the I/O window has a fixing slot and a first screw hole located in a side of the I/O window;

an auxiliary fastener including a first baffle, a second baffle, a third baffle, a fixing hook and a positioning hook, wherein the first baffle has a second screw hole, the second baffle and the fixing hook are connected with the first baffle, the third baffle and the positioning hook are connected with the second baffle, the fixing hook of the auxiliary fastener passes through the fixing slot of the I/O window to make the auxiliary fastener rotatably fixed to the I/O window; and a bracket in the interface card, wherein the bracket of the interface card is installed on the I/O window, the positioning hook of the auxiliary fastener is plugged into a corresponding through hole on the bracket of the interface card to achieve the positioning goal, a screw is passed through the second screw hole of the auxiliary fastener in a direction that is vertical to the interface card and is screwed on the first screw hole of the I/O window, the auxiliary fastener is fixed onto the housing and the bracket of the interface card is pushed and stopped by the baffles.

2. The auxiliary fixing mechanism as claimed in claim 1, wherein the I/O window has a plug base protruded and located at one end near the front surface of the I/O window and a fixing hole located at another end of the I/O window, a plugged part and a fixing part are individually formed at two ends of the bracket of the interface card, the fixing part has a through hole, the plugged part located at one end of the bracket is plugged and fixed at the plug base of the I/O window, the fixing part located at another end of the bracket is jointed at another end of the I/O window, the positioning hook of the auxiliary fastener is plugged into the through hole of the bracket of the interface and the fixing hole of the I/O window.

3. The auxiliary fixing mechanism as claimed in claim 1, wherein the second baffle is connected to one side of the first baffle, the second baffle extends downward, and the second baffle is vertical to the first baffle.

4. The auxiliary fixing mechanism as claimed in claim 1, wherein the third baffle is connected to one side of the second baffle, and the third baffle is vertical to the second baffle.

5. The auxiliary fixing mechanism as claimed in claim 1, wherein the fixing hook is connected to another side of the first baffle, the fixing hook extends a distance that is far away from the first baffle and extends downward, the shape of one end of the fixing hook is T-shaped.

6. The auxiliary fixing mechanism as claimed in claim 1, wherein the positioning hook is connected with a lower side of the second baffle.

7. The auxiliary fixing mechanism as claimed in claim 1, wherein the auxiliary fastener further comprises a rotation handle, the rotation handle is connected to another side of the first baffle, the rotation handle extends a distance that is far away from the first baffle.

* * * * *